UNITED STATES PATENT OFFICE.

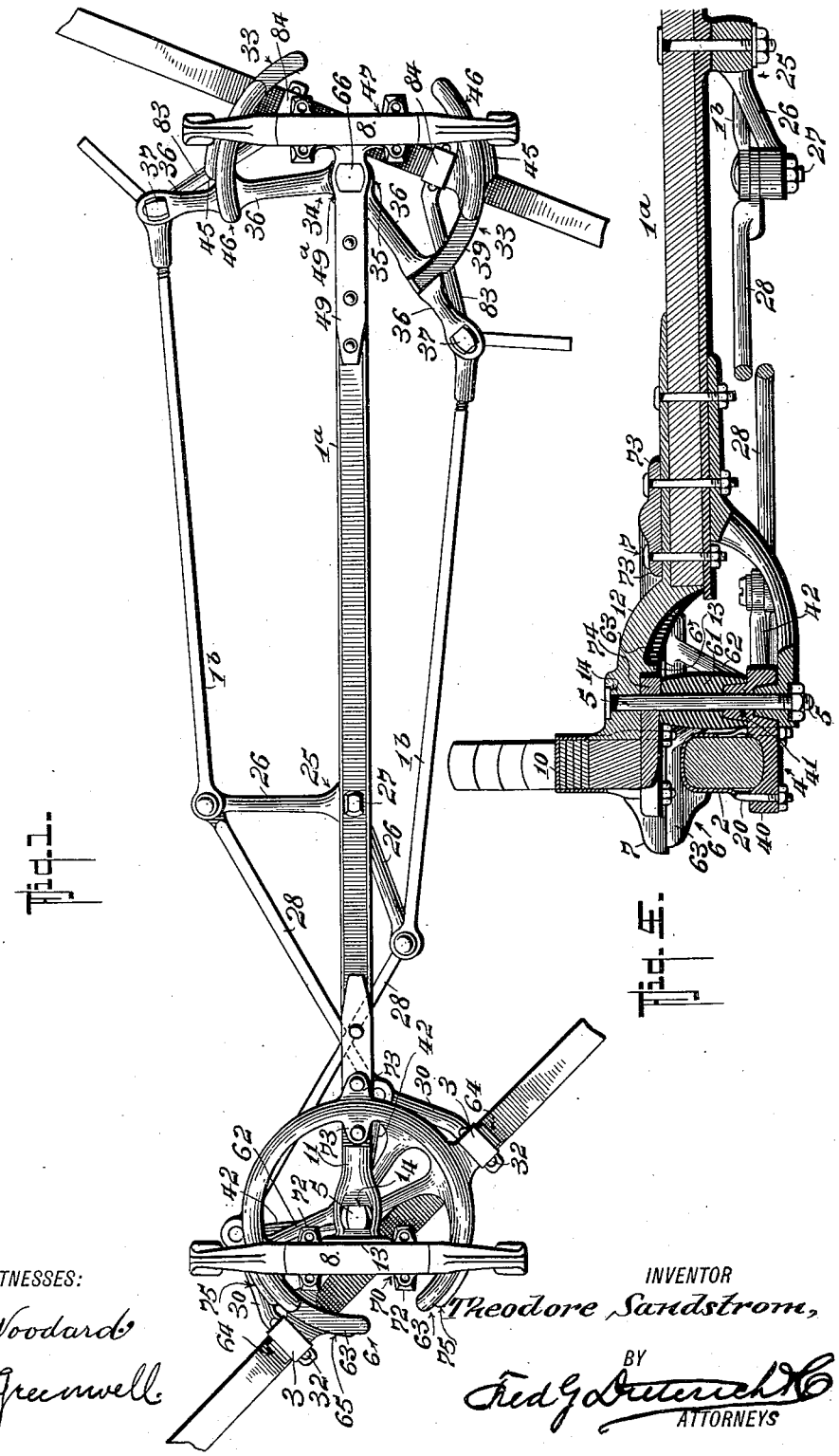

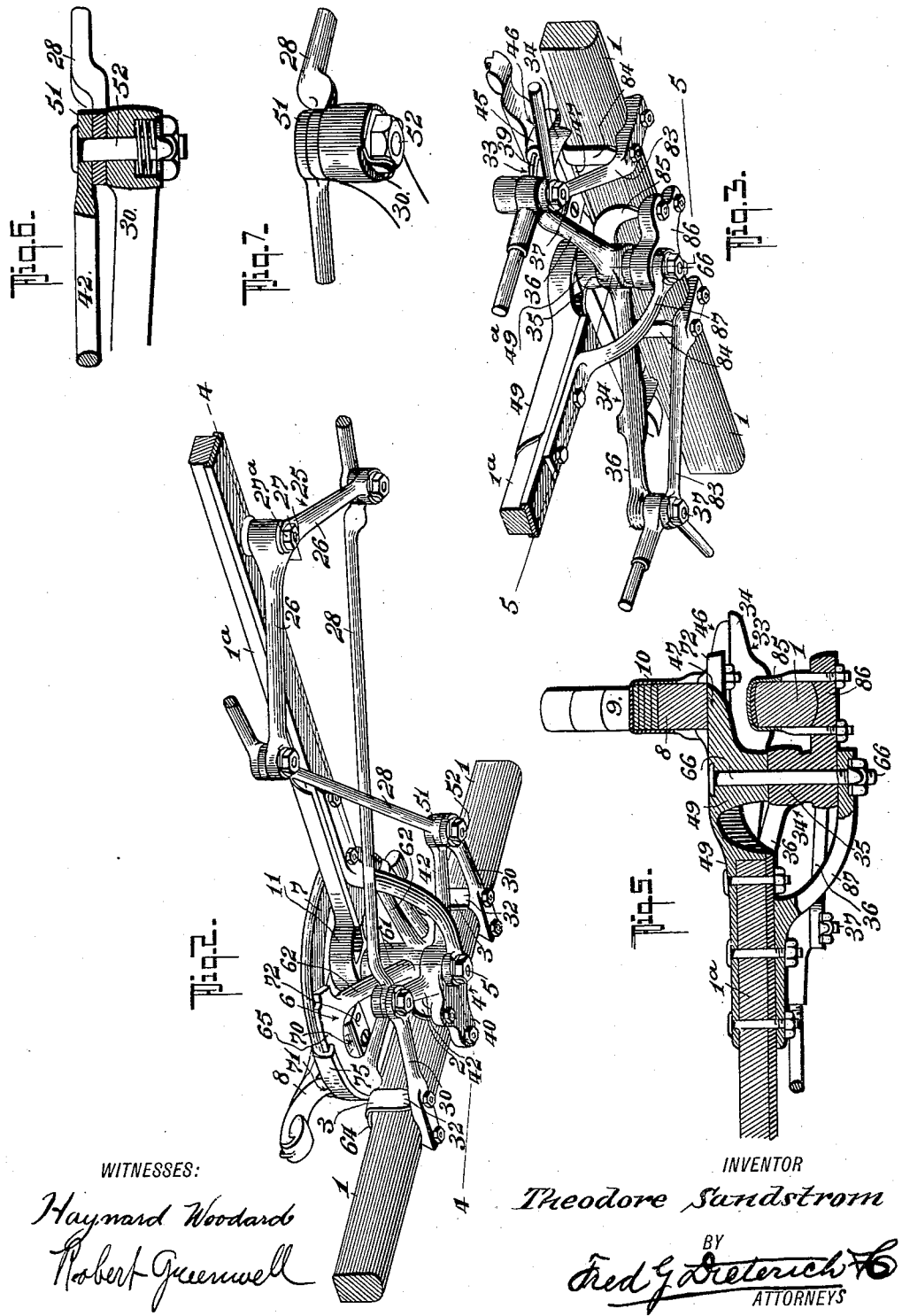

THEODORE SANDSTROM, OF INDIANAPOLIS, INDIANA.

SHORT-TURN VEHICLE-GEAR.

1,069,190. Specification of Letters Patent. Patented Aug. 5, 1913.

Application filed October 14, 1912. Serial No. 725,630.

*To all whom it may concern:*

Be it known that I, THEODORE SANDSTROM, residing at Indianapolis, in the county of Marion and State of Indiana, have invented certain new and useful Improvements in Short-Turn Vehicle-Gears, of which the following is a specification.

My present invention, which relates generally to that class of short turn vehicle gear mechanisms in which is included front or fifth wheel and coöperating back or sixth wheel devices, more specifically has reference to the short turn vehicle gear mechanism disclosed in the patent granted to me May 4, 1909, No. 920,662.

My said present invention primarily has for its object to simplify the construction and arrangement of the parts shown in the said patent, particularly the front connections that join the parallelly disposed coupling rods with the forward axle, so as to materially increase the strength of the gear mechanism, and materially reduce the cost of the manufacture of the said parts.

In my former patent referred to, I have shown and described yieldable members in the connections that join the parallel or connecting or reach rods with the front axle. I have found, from practical experience, that the yieldable connections, while for some styles of vehicle bodies effectively serve their intended purpose, they are not entirely satisfactory for all styles of vehicle bodies and further the said yieldable connections are expensive to maintain. In my present invention the said yieldable devices are omitted and in lieu thereof a rigid rod connection is provided that is so designed for coöperating with the front axle and the parallel connecting or reach rods, whereby the necessity of shortening one of the front connecting members when turning about is overcome, and the said front connections rendered of a more stable construction and positive in operation.

With other objects in view that will hereinafter appear, my present invention embodies the peculiar construction and novel arrangement of the parts hereinafter fully explained, specifically pointed out in the appended claims and illustrated in the accompanying drawings, in which:

Figure 1 is a plan view of my improved short turn vehicle gear, the front and rear axles and the coöperating parts being shown at a turning position. Fig. 2 is a perspective view of the front axle, the fifth wheel device and the connections that join the axle with the reach bar and the parallel connecting rods. Fig. 3 is a similar view of the rear axle and the coöperating parts combined therewith. Fig. 4 is a longitudinal section taken substantially on the line 4—4 on Fig. 2. Fig. 5 is a like view taken on the line 5—5 on Fig. 3. Fig. 6 is a detail section of one of the pivotal joints hereinafter specifically explained. Fig. 7 is a perspective view of same.

In carrying out my present invention the front axle 1 is mounted in a central clip 2 and two end clips 3, one at each side of the central clip 2, the latter including the nut receiving shanks 20, that pass down through the head portion 40 of a front lever frame 4, provided with an aperture 41 for the king bolt 5 and with oppositely projected obtuse angle arms 42, the outer ends of which form joint bearings 51 for receiving the pivot bolts 52, and each of which joins with an arm 30 that forms the clamping bars to which the shanks 32 of the clips 3 are secured, as shown.

6 designates a cast frame that forms the lower or movably held member of the front or fifth wheel, and the same includes a vertically apertured hub 61 that receives the king bolt 5, and the oppositely projected integral spokes 62, the ends of which have integral segmental members 63 that form the bearings for the upper fifth wheel member 7. Each of the segmental members 63 includes a lateral lug 64 that rests upon the top of the front axle, and the said lugs 64 are secured upon the axle by the clips 3.

The upper or fixedly held fifth wheel member 7 includes a segmental or ring-like member formed at its opposite front ends with a cross or seat bar 70 for receiving the front wagon spring holding bolster 8, the said member 7 also having seats 71 for the member 8, the latter and the springs 9 and the said bolster 8 being secured by the clips 10 whose threaded shanks engage the lateral lugs 72 on the cross bar 70, as shown.

The upper wheel member 7 is fixedly held upon the front end of the reach bar 1ª, it having lateral lugs 73 that bolt through the cast metal extension 11 of the reach bar 1ª, and which includes a head portion 12 that straddles a rearwardly extended apertured lug 74 on the cross or seat bar 70, it having pendent ears 13 that drop over the edges of the said lug 74, the latter and the head portion 12 being apertured to receive the king bolt 5, the head of which engages a seat 14 in the said head to which it is firmly held by the tension spring lock that engages the lower end of the king bolt, as is clearly shown in the drawing. To further guide and hold the two front or fifth wheel members in proper alinement, the lower member has lug-like flanges 65 that engage the grooved flanges 75 on the upper member 7.

While I prefer to use the form of front fifth wheel shown and described, I desire it understood that my present improvements are not necessarily restricted in the use of the said fifth wheel construction stated.

In my present invention, I use the same arrangement of coupling rods $1^b$ as in my other patent referred to and the front ends of the said rods in my present construction likewise pivotally join with the outer ends of a rocking lever 25 that is fulcrumed on a stud 27 pendent from the reach bar $1^a$, and secured by the adjusting nut $27^a$. Lever 25 includes the relatively obtuse angle arms 26—26 that form, as it were, opposites for the arms 42 of the lever frame 4.

28—28 designate a pair of cross or lever rods that connect the lever frames 4 and 25, they having their ends suitably bent, as shown, to provide for a proper clearance at their cross over points.

The rear or sixth wheel mechanism, in my present construction, includes a bottom section 33 formed with opposite segmental bearing portions having flanges 39, that engage the grooved pendent flanges 45 on the segmental portions 46 of the upper sixth wheel section, which also includes a cross member 47 to which the rear vehicle body holder bolster 8 is secured, and a forwardly extended integral arm 49 that bolts to the rear end of the reach bar and is provided with an apertured pendent hub $49^a$ for receiving the rear king bolt 66. The lower sixth wheel section 33 further includes an integral lever frame 34 that has an apertured hub 35, and side arms 36 that extend at an obtuse angle from the hub.

By referring to Fig. 1 of the drawing it will be noticed that the lever frame 34 is substantially in parallelism with the rocker or lever frame, to which the front ends of the coupling rods $1^b$ and the rear ends of the said rods $1^b$ pivotally join to the outer ends of the side arms 36 by the joint bolts 37 that extend down through suitable bearings in the opposite pair of brace frames 83, the inner ends of which form the clamping bar of the end clips 84—84 that engage and secure the cross bar of the section frame 33 on the rear axle and whose outer ends are secured to the said axle, as shown.

85 designates a central clip at the rear axle that includes a bottom or clamp plate 86 formed with an apertured hub to receive the hub portion of the lever frame 34 and the rear king bolt, the latter also passing down through a bracket 87 that extends down from the rear end of the reach bar $1^a$.

From the foregoing description, taken in connection with the drawing, it is believed the complete construction, the manner in which the several parts coöperate and the advantages of the arrangement shown will be readily apparent to those skilled in the art to which my invention relates.

By reason of joining the connecting rods $1^b$ to two rocking lever frames, a front and a rear one, arranged in parallelism, and providing a similar lever frame rockably mounted on the forward axle, and having a reverse relation with respect to the front lever frame to which the rods $1^b$ join, and coupling the two reversely disposed rocker or lever frames by means of pivotally held cross rods, a positive transmission of the turning motion of the front axle is transmitted to the rear axle and vice versa, under a practically fixed relation of the connections that join the several rods, and rocking levers, by reason of which the need of yielding or take-up cross connections, such as is shown and described in my patent referred to, is entirely avoided. Again, in my present arrangements, a positive connection of the several levers and connecting rods or links is such that rattling is overcome, the two axles are caused to work uniformly together, it being understood that the limit of the turning of the axles in either direction is determined by the inner ends of segments of the lower section or front fifth wheel devices abutting the front end of the reach bar $1^a$.

What I claim is:

1. In a short turn wagon gear which includes fifth and sixth wheel mechanisms mounted respectively on the front and rear axles, each of the said mechanisms including a horizontally rotatable member attached to and movable with their respective axles and each including an angle frame, the angle frame for the front or fifth wheel mechanism opposing the angle frame of the rear or sixth wheel mechanism, and connections that join the two angle frames, the said connections including reach rods, one end of each of which pivotally connects with the opposite ends of the angle frame of the sixth wheel mechanism, and pivotal connections including crossed over members that connect the front ends of the reach rods and the ends of the angle frame of the fifth wheel mechanism.

2. In a short turn wagon gear which includes fifth and sixth wheel mechanisms mounted respectively on the front and rear axles, and a reach bar, each of said mechanisms including a horizontally rotatable member attached to and movable with their respective axles and each including an angle frame, the angle frame for the front or fifth wheel mechanism opposing the angle frame of the rear or sixth wheel mechanism, and connections that join the two angle frames, the said connections including reach rods, one end of each of which pivotally connects with the opposite ends of the angle frame of the sixth wheel mechanism, and pivotal connections that include an angle frame pivotally mounted on the reach bar and held in substantial parallelism with the rear angle frame and crossed over members that connect the outer ends of the angle frame on the reach bar and the outer ends of the arms of the angle frame of the fifth wheel mechanism.

3. In a short turn wagon gear, front and rear axles, fifth and sixth wheel mechanisms respectively mounted thereon, each of the said mechanisms including upper and lower members, a reach bar connecting the upper members, an angled lever fulcrumed on the reach bar between the two mechanisms, coupling rods that pivotally connect with the outer ends of the said angled lever on the reach bar that extend rearwardly in parallelism with the said reach bar, the lower member of the sixth wheel mechanism including an angle frame with whose outer ends the said coupling rods pivotally connect, and crossed over members that pivotally connect at one end with the angled lever on the reach bar and whose other ends have jointed connections with the front axles.

4. In a short turn wagon gear, front and rear axles, a reach bar, a fifth wheel on the front axle and a sixth wheel on the rear axle, the aforesaid fifth and sixth wheel mechanisms each including an obtusely-angled frame, the said two angle frames opposing one another, flexible connections between the two frames that include reach rods that pivotally connect with the rear angle frame, an angle frame on the reach bar that opposes the front angle frame and is in substantial parallelism with the rear angle frame and crossed members that pivotally join with the outer ends of the angle frame on the reach bar and the fifth wheel angle frame.

5. In a wagon gear of the character stated; the combination with the rear axle, the reach bar and the sixth wheel mechanism on the rear axles, the said sixth wheel mechanism including an angle frame that forms a part of the lower or turning member of the said sixth wheel mechanism, an angle frame that is rockably mounted on the reach bar and rods that connect the said reach bar angle frame and the rear sixth wheel angle frame whereby to cause them to be moved in unison, a front axle, a fifth wheel mechanism mounted thereon and including an upper member that rigidly joins with the front end of the reach bar, said bar having a king bolt, a lower fifth wheel member having a hub to receive the king bolt and angle arms that oppose the arms of the angle frame on the reach bar and crossed over members that pivotally join the reach bar angle arms and the angle arms on the front or fifth wheel mechanism.

THEODORE SANDSTROM.

Witnesses:
MAURICE M. KIEFER,
PHILIP MARER.

---

Copies of this patent may be obtained for five cents each, by addressing the "Commissioner of Patents, Washington, D. C."